United States Patent
Akhlaque-e-rasul et al.

(10) Patent No.: US 9,821,852 B2
(45) Date of Patent: Nov. 21, 2017

(54) PRESSURIZED AIR INSERT FOR SIDE IMPACTS

(71) Applicant: Ford Global Technologies, LLC, Dearborn, MI (US)

(72) Inventors: Shaikh Akhlaque-e-rasul, Windsor (CA); Zhenyan Gao, Northville, MI (US); Cheng Luo, Dearborn Heights, MI (US); Bill Moore Sherwood, Royal Oak, MI (US)

(73) Assignee: FORD GLOBAL TECHNOLOGIES LLC, Dearborn, MI (US)

(*) Notice: Subject to any disclaimer, the term of this patent is extended or adjusted under 35 U.S.C. 154(b) by 0 days.

(21) Appl. No.: 15/014,738

(22) Filed: Feb. 3, 2016

(65) Prior Publication Data

US 2017/0217498 A1   Aug. 3, 2017

(51) Int. Cl.
    *B62D 21/15*   (2006.01)
    *B60K 1/04*    (2006.01)
    *B62D 25/02*   (2006.01)
    *B62D 25/20*   (2006.01)

(52) U.S. Cl.
    CPC ............. *B62D 21/157* (2013.01); *B60K 1/04* (2013.01); *B62D 25/025* (2013.01); *B62D 25/2036* (2013.01); *B60K 2001/0438* (2013.01); *B60Y 2306/01* (2013.01)

(58) Field of Classification Search
    CPC ............... B62D 21/157; B62D 25/025; B62D 25/2036; B60R 2021/0006; B60R 2021/343; B60R 21/21; B60R 21/36; B60K 2001/0438; B60K 1/04; B60Y 2306/01
    See application file for complete search history.

(56) References Cited

U.S. PATENT DOCUMENTS

| | | | | |
|---|---|---|---|---|
| 3,338,614 A | * | 8/1967 | Sadler, Jr. | B60R 19/48 224/401 |
| 3,689,054 A | * | 9/1972 | Gouirand | B60G 11/27 267/68 |
| 3,708,194 A | * | 1/1973 | Amit | B60R 19/205 141/317 |
| 3,862,669 A | * | 1/1975 | Lindbert | B60R 19/32 180/274 |

(Continued)

FOREIGN PATENT DOCUMENTS

| | | | |
|---|---|---|---|
| JP | 2003335267 A | * | 11/2003 |
| WO | WO 2012019972 A1 | | 2/2012 |

OTHER PUBLICATIONS http://www.wranglerforum.com/f274/write-up-pressurized-running-water-on-jeep-using-stock-bumper-as-tank-233410.html; Apr. 2013.*

(Continued)

*Primary Examiner* — Laura Freedman
(74) *Attorney, Agent, or Firm* — Franak A. MacKenzie; Bejin Bieneman PLC

(57) ABSTRACT

A frame assembly for a vehicle includes a rocker elongated along an axis and defining a tubular cavity elongated along the axis. The vehicle frame assembly includes a sealed pressurized insert disposed in the cavity and elongated along the axis. The sealed pressurized insert increases the stiffness of the rocker, i.e., decreases the likelihood of deformation of the rocker during an impact of the vehicle, such as a side impact.

18 Claims, 6 Drawing Sheets

(56) References Cited

U.S. PATENT DOCUMENTS

| | | | | |
|---|---|---|---|---|
| 4,174,014 A * | 11/1979 | Bjorksten | B60K 1/04 180/68.5 |
| 4,487,446 A * | 12/1984 | Reich, II | B60C 23/10 137/899.4 |
| 4,944,553 A * | 7/1990 | Medley | B62D 25/025 296/203.03 |
| 4,995,659 A * | 2/1991 | Park | B60R 13/00 293/107 |
| 5,224,732 A * | 7/1993 | Warner | B60R 21/0136 280/730.2 |
| 5,370,418 A * | 12/1994 | Pugh | B60K 15/03006 180/311 |
| 5,392,024 A * | 2/1995 | Kiuchi | B60R 21/0136 280/735 |
| 5,501,289 A * | 3/1996 | Nishikawa | B60K 1/04 180/65.1 |
| 5,725,265 A * | 3/1998 | Baber | B60R 19/205 280/728.3 |
| 5,732,785 A * | 3/1998 | Ran | B60R 19/205 180/271 |
| 5,845,937 A * | 12/1998 | Smith | B62D 21/157 280/756 |
| 5,924,765 A * | 7/1999 | Lee | B62D 21/157 267/116 |
| 6,053,564 A * | 4/2000 | Kamata | B62D 21/152 296/187.09 |
| 6,322,135 B1 * | 11/2001 | Okana | B62D 25/025 296/193.05 |
| 6,375,251 B1 * | 4/2002 | Taghaddos | B60R 19/00 296/187.03 |
| 6,386,625 B1 * | 5/2002 | Dukat | B62D 25/025 296/187.12 |
| 6,883,631 B2 * | 4/2005 | Hu | B60R 19/205 180/274 |
| 7,118,170 B2 * | 10/2006 | Montanvert | B62D 21/157 296/209 |
| 7,234,765 B1 * | 6/2007 | Mazzei | B60J 5/0419 296/146.2 |
| 7,472,922 B2 * | 1/2009 | Wu | B60R 21/23184 280/730.2 |
| 7,488,017 B2 * | 2/2009 | Lassl | B62D 21/157 293/133 |
| 7,500,714 B2 * | 3/2009 | Abe | B62D 21/157 296/187.09 |
| 7,607,677 B1 * | 10/2009 | Bosak | B60D 1/485 280/420 |
| 7,845,661 B2 * | 12/2010 | Kondou | B62D 21/15 280/124.108 |
| 7,959,216 B2 * | 6/2011 | Perotto | B60R 19/00 296/187.03 |
| 8,007,032 B1 * | 8/2011 | Craig | B62D 21/157 296/187.12 |
| 8,366,185 B2 * | 2/2013 | Herntier | B62D 25/025 296/187.12 |
| 8,393,427 B2 | 3/2013 | Rawlinson | |
| 8,585,134 B2 * | 11/2013 | Yasui | B62D 21/152 296/204 |
| 8,608,230 B2 * | 12/2013 | Young | B60K 1/04 296/187.02 |
| 8,702,161 B2 | 4/2014 | Charbonneau et al. | |
| 9,045,164 B2 * | 6/2015 | Matsuda | B62D 25/2036 |
| 9,054,402 B1 * | 6/2015 | Rawlinson | F41H 7/042 |
| 2005/0218696 A1 * | 10/2005 | Aase | B60R 19/00 296/187.02 |
| 2012/0103714 A1 | 5/2012 | Choi et al. | |
| 2013/0017421 A1 | 1/2013 | Onnerud et al. | |
| 2016/0280273 A1 * | 9/2016 | Nusier | B62D 25/2036 |
| 2016/0280274 A1 * | 9/2016 | Nusier | B62D 21/03 |
| 2016/0355152 A1 * | 12/2016 | Perez Garcia | B60R 21/233 |

OTHER PUBLICATIONS http://www.wranglerforum.com/f118/rear-bumper-air-tank-33130.html; Jul. 2009.*

Toyota Avalon Hybrid 2013 Model Emergency Response Guide, © 2012 Toyota Motor Corporation (34 pages).

* cited by examiner

PRESSURIZED AIR INSERT FOR SIDE IMPACTS

BACKGROUND

Electric vehicles, such as full hybrid-electric vehicles (FHEV), plug-in hybrid-electric vehicles (PHEV), and battery electric vehicles (BEV), include batteries that store energy that the vehicle uses to operate. One relatively convenient location for the batteries is beneath the floor of the vehicle to prevent creating additional packaging constraints in areas of the vehicle where space is crowded and/or valuable, e.g., the engine compartment, the trunk space, etc.

This location, however, may expose the batteries to damage during vehicle impacts, e.g., side impacts. There remains an opportunity to design a vehicle with the batteries beneath the floor of the vehicle while also providing adequate protection to the batteries.

DETAILED DESCRIPTION

Figure 1:
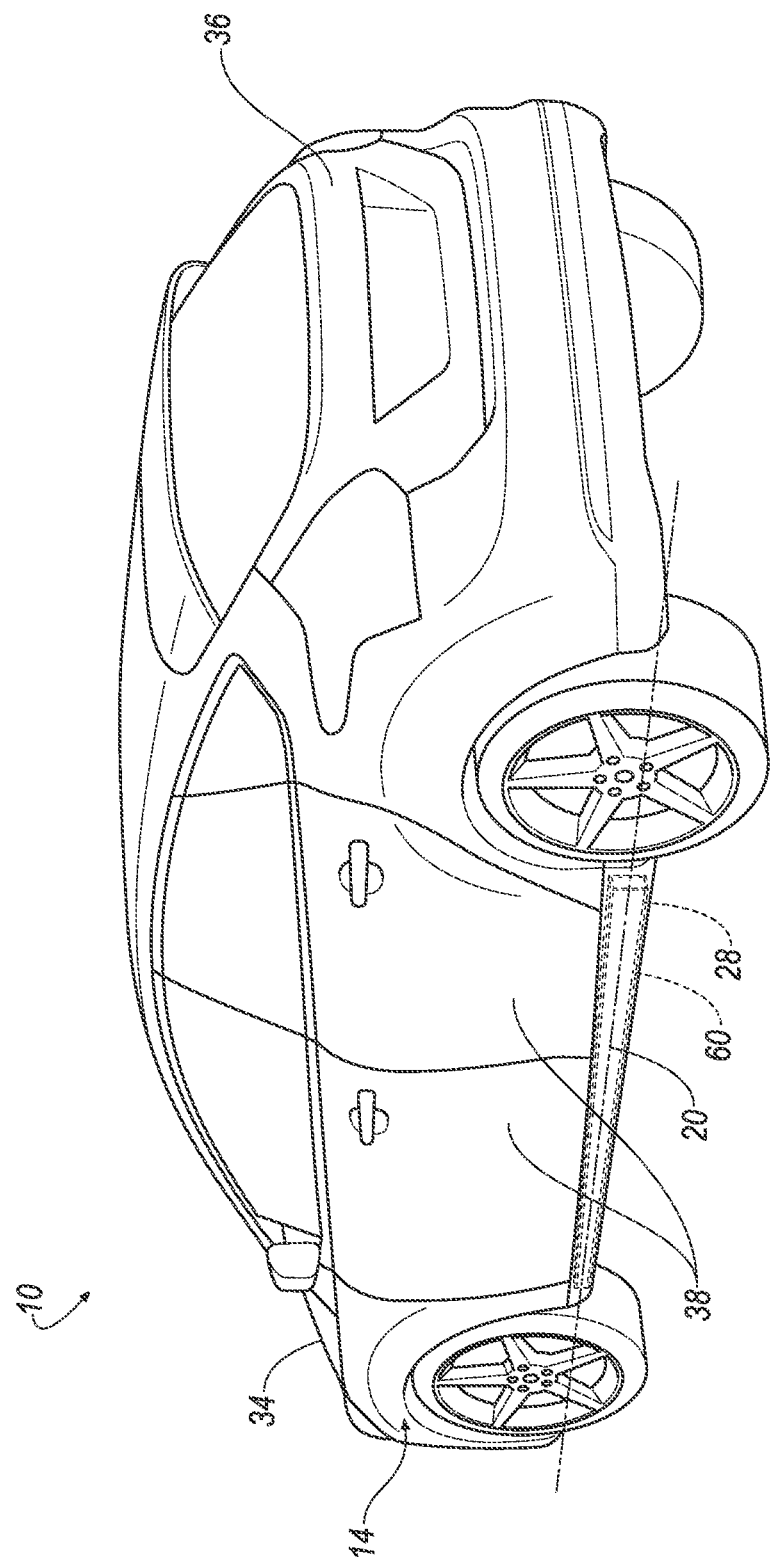
FIG. 1 is a perspective view of a vehicle with a sealed pressurized insert shown in hidden lines.

With reference to the Figures, wherein like numerals indicate like parts throughout the several views, a vehicle frame assembly 12 of a vehicle includes a rocker 16 (hereinafter referred to as the "first rocker 16") elongated along an axis 20 and defining a tubular cavity 24 elongated along the axis 20. The vehicle frame assembly 12 includes a sealed pressurized insert 28 disposed in the cavity 24 and elongated along the axis 20. As set forth further below, the vehicle frame assembly may include more than one rocker, i.e., the first rocker 16 and a second rocker 18. The first rocker 16 and the second rocker 18 may be mirror images of each other, and otherwise may be identical. The adjectives "first" and "second" are used throughout this document as identifiers and are not intended to signify importance or order.

The sealed pressurized insert 28 increases the stiffness of the first rocker 16, i.e., decreases the likelihood of deformation of the first rocker 16 during an impact of the vehicle 10, such as a side impact. This increase in stiffness reduces the likelihood of intrusion into a passenger compartment (not numbered) of the vehicle and/or a battery compartment 54 that houses a battery 32. Specifically, the increased stiffness of the first rocker 16 distributes the forces from an impact to reduce the likelihood and/or magnitude of intrusion to the battery 32 during the vehicle impact.

With reference to FIG. 1, the vehicle 10 includes a body 14 supporting body panels (not numbered). The body panels may include a hood 34, a decklid 36, doors 38, and the first and second rockers 16, 18 below the doors 38. The body 14 may be of a unibody construction in which at least some of the body 14 is exposed and may present a class-A surface (not numbered), i.e., a surface specifically manufactured to have a high-quality, finished aesthetic appearance free of blemishes. For example, the rockers 16 and 18 may be exposed and may present class-A surfaces. The body 14 may, alternatively, be of a body-on-frame construction, or of any other suitable construction. The body 14 may be formed of any suitable material, for example, steel, aluminum, etc.

Figure 2:
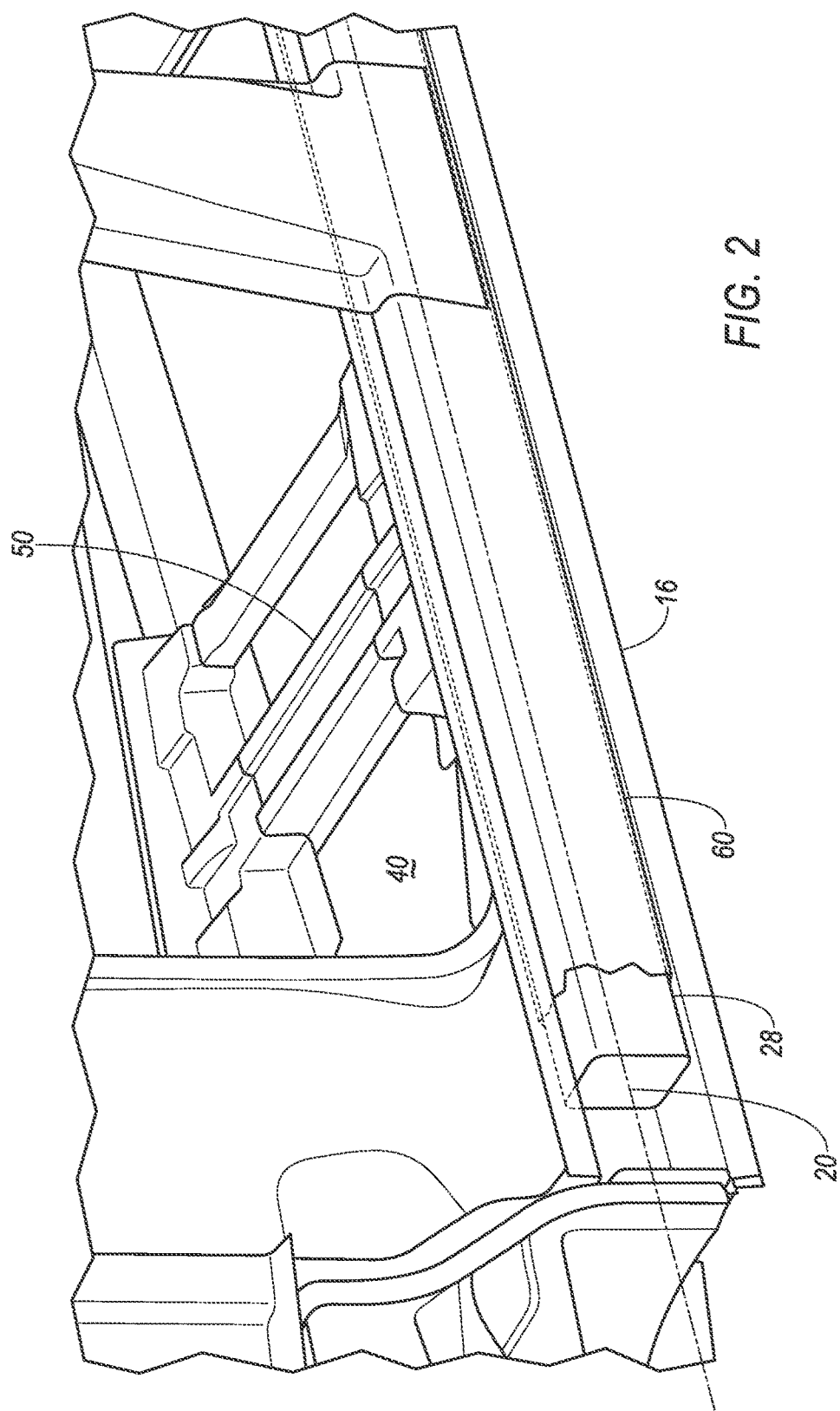
FIG. 2 is a perspective view of a body of the vehicle with the sealed pressurized insert shown in hidden lines and an outer panel and part of a reinforcing sleeve removed.
Figure 3:
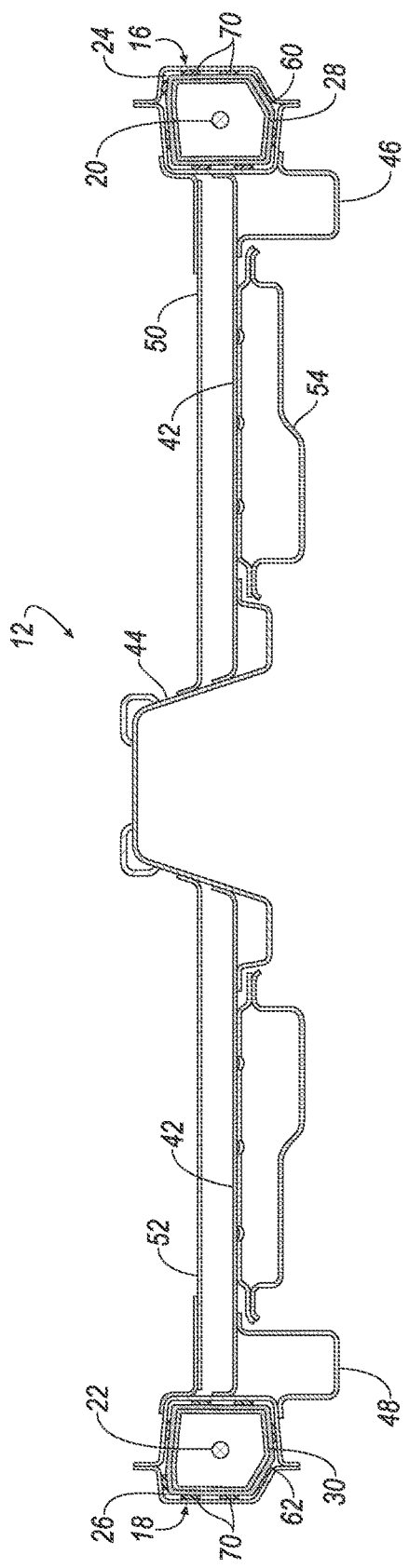
FIG. 3 is a cross-sectional view of a portion of the body with the sealed pressurized insert shown in hidden lines in the rocker, and with another sealed pressurized insert shown in hidden lines in another rocker.
Figure 4:
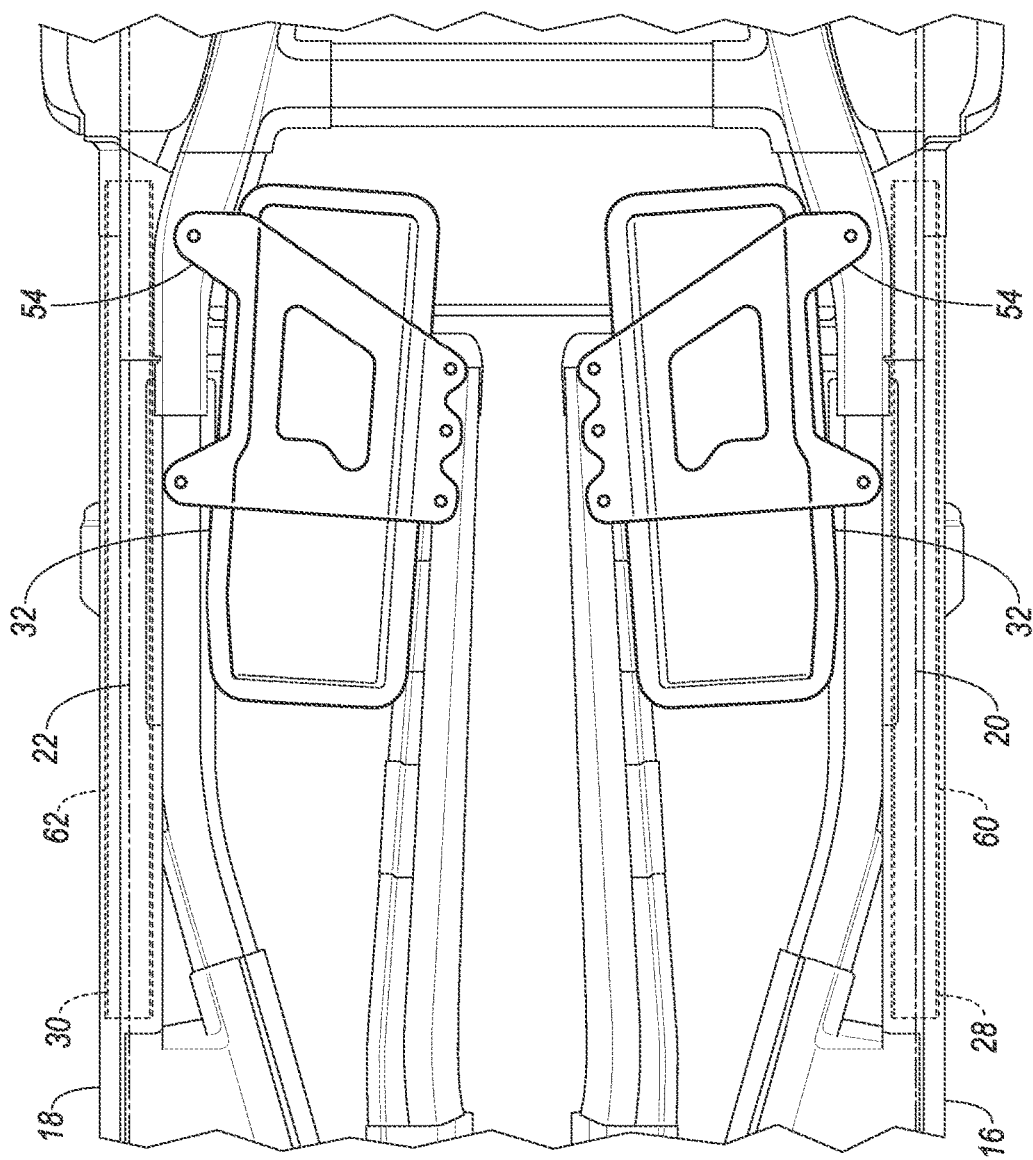
FIG. 4 is a bottom view of a portion of the body including a battery compartment between the rockers.

With reference to FIGS. 2-4, the body 14 includes an undercarriage 40. The undercarriage includes a tunnel 44, which provides space for drivetrain components (not numbered), e.g., a transmission. The undercarriage 40 may include floor panels 42 on either side of the tunnel 44. The floor panels 42 may extend from the tunnel 44 to the first rocker 16 and the second rocker 18, respectively, and may be attached to the first rocker 16 and the second rocker 18.

A first sled runner 46 may be attached to the floor panel 42 from below and to the first rocker 16, and a second sled runner 48 may be attached to the floor panel 42 from below and to the second rocker 18. A first cross-member 50 may extend from the first rocker 16 to the tunnel 44 along the floor panel 42, and a second cross-member 52 may extend from the second rocker 18 to the tunnel 44 along the floor panel 42. The first cross-member 50, the second cross-member 52, and/or the tunnel 44 may be integrally formed with the floor panel 42, i.e., may be formed simultaneously as a single continuous unit, e.g., by metal stamping.

The undercarriage defines a battery compartment 54. The undercarriage 40, the first rocker 16, the second rocker 18, the first sled runner 46, the second sled runner 48, the first cross-member 50, the second cross-member 52, and the battery compartment 54 are all part of the vehicle frame assembly 12.

The battery compartment 54 is adapted to house at least one battery 32, i.e., is positioned and sized to house at least one battery 32. The battery 32 may be supported by the undercarriage 40, e.g., may be supported by components of the battery compartment 54 that are supported on the undercarriage 40. Alternatively, the battery 32 may be supported by the undercarriage by any other suitable feature.

The battery 32 may be of any suitable type for vehicular operations, for example, lithium-ion batteries, nickel-metal hydride batteries, lead-acid batteries, or ultracapacitors, as used in PHEVs, FHEVs, BEVs, etc.

Figure 5:
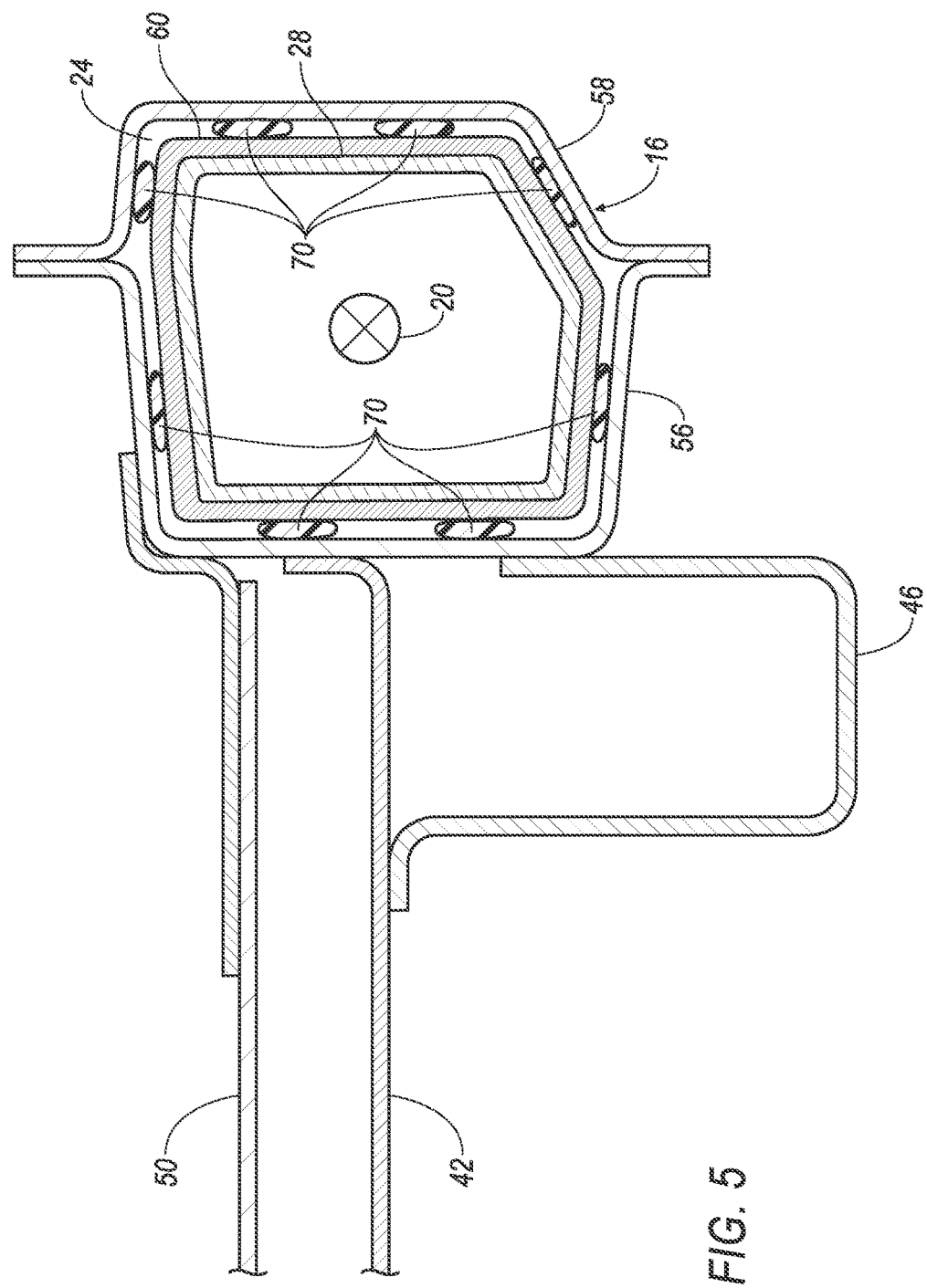
FIG. 5 is a cross-sectional view of portion of the body and one of the sealed pressurized inserts.
Figure 6:
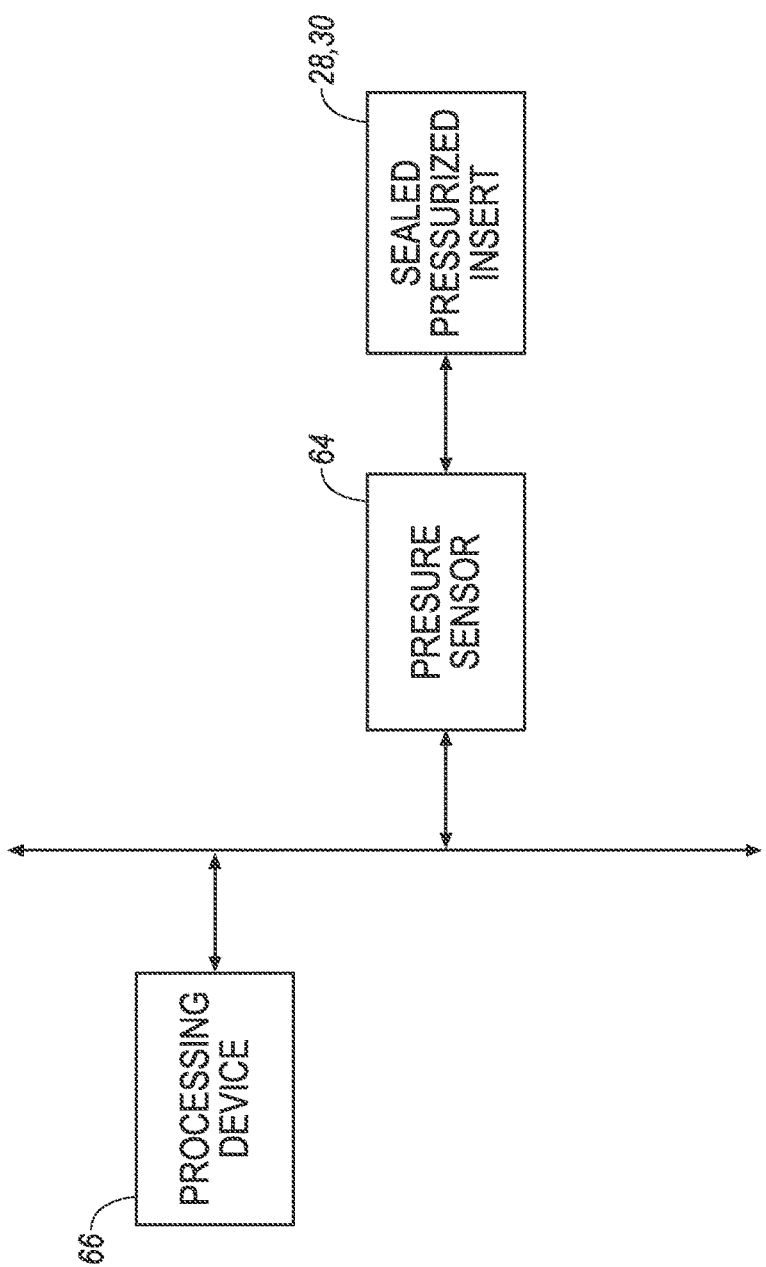
FIG. 6 is a diagram of a pressure-sensing system.

As set forth above, the first rocker 16 is elongated along the axis 20. The axis 20 may extend along, i.e., be spaced from and parallel with, a longitudinal axis of the vehicle 10, in other words, along the direction of travel of the vehicle 10. With reference to FIG. 5, the first rocker 16 defines the tubular cavity 24 elongated along the axis 20. The second rocker 18 is likewise elongated along a second axis 22 parallel to the axis 20 and defines a second tubular cavity 26 elongated along the second axis 22. The rockers 16 and 18 may maintain mostly the same cross-section along the axes 20 and 22, respectively, i.e., may have a continuous cross-section along axes 20 and 22, respectively. The tubular cavities 24, 26 may be of any suitable cross-sectional shape.

The first and second rockers 16 and 18 may each include an inner panel 56 and an outer panel 58 joined together to define the tubular cavity 24 and the second tubular cavity 26, respectively, between the respective inner panel 56 and outer panel 58. The inner panel 56 and the outer panel 58 may be joined together by welding, by fasteners, by hemming, and/or by any other suitable means. The rockers 16 and 18 may be formed of metal such as steel or aluminum. The rockers 16 and 18 may present class-A surfaces toward the outside of the vehicle, or alternatively they may be covered with rocker panels (not numbered).

With reference to FIG. 5, a reinforcing sleeve 60 may be coupled to the sealed pressurized insert 28 and another reinforcing sleeve 60 may be coupled to the sealed pressurized insert 30. The reinforcing sleeves 60 may be disposed in the tubular cavity 24 and in the tubular cavity 26, respectively. The reinforcing sleeves 60 extend around the sealed pressurized insert 28 and the sealed pressurized insert 30, respectively. The reinforcing sleeves 60 may be formed of metal, such as steel or aluminum.

The reinforcing sleeves 60 may contact at least a portion of the inside of the first rocker 16 and the second rocker 18, respectively. The reinforcing sleeves 60 may be attached to the first rocker 16 and/or the second rocker 18 with an adhesive bond 70. The reinforcing sleeves 60 may be attached to the first rocker 16 and/or second rocker 18, respectively, or may be located inside the first rocker 16 and/or the second rocker 18, respectively, without attachment.

The sealed pressurized insert 28 is disposed in the cavity 24 and elongated along the axis 20. Specifically, the sealed pressurized insert 28 is disposed in the reinforcing sleeve 60. Likewise, the second sealed pressurized insert 30 is disposed in the second cavity 26 and elongated along the second axis 22, specifically in the second reinforcing sleeve 62.

The sealed pressurized inserts 28, 30 may be formed of a material that is flexible relative to the reinforcing sleeves 60, 62 and/or the rockers 16, 18. For example, the sealed pressurized inserts 28, 30 may be formed of rubber or another elastomeric material. The use of a flexible material, such as rubber, for the inserts 28, 30 allows the insert 28, 30 to adapt to the internal shape of the respective cavities 24, 26 and/or respective reinforcing sleeves 60, 62. The sealed pressurized inserts 28, 30, alternatively, may be formed of any suitable type of material.

The inserts 28, 30 may be pressurized and sealed before installation to the vehicle and are designed to maintain the pressurization over the lifetime of the vehicle. The insert 28, 30 may be pressurized with air, oxygen, nitrogen, and/or any other suitable gas.

In the event the insert 28, 30 loses pressure during the life of the vehicle 10, the respective insert 28, 30 may be removed from the vehicle 10, e.g., from the reinforcing sleeve 60 and/or second reinforcing sleeve 62, and may be replaced. For example, a pressure sensor 64 may be in the sealed pressurized insert 28, 30. The pressure sensor 64 is in communication with the sealed pressurized insert 28 and with a processing device 66. The pressure sensor 64 detects the pressure in the sealed pressurized insert 28 and specifically may detect whether the pressure decreases below a designated threshold value. The pressure sensor 64 may be in communication with a processing device 66, which may include a data storage medium that stores computer-executable instructions associated with receiving signals, transmitting signals, or both. For example, the processing device 66 may receive a signal from the pressure sensor 64 that the pressure level of the sealed pressurized insert 28 has decreased below the designated threshold value and may then transmit a signal to illuminate a warning light (not numbered) visible to a driver of the vehicle 10 indicating that the driver should have a professional perform maintenance on the vehicle.

In a side impact of the vehicle 10, the vehicle frame assembly 12 including the reinforcing sleeves 60, 62 and the sealed pressurized insert 28, 30 reduce the likelihood and/or magnitude of intrusion. One test to measure the side-impact performance of a vehicle is the side impact rigid pole test described in Federal Motor Vehicle Safety Standard 214, in which a rigid vertical pole 10 inches in diameter is delivered to the side of the test vehicle at 20 miles per hour. The presence of the reinforcing sleeves 60, 62 and the sealed pressurized inserts 28, 30 reinforce the first or second rockers 16, 18 to resist deformation and intrusion caused by impact with the vertical pole, or other obstacle simulated by the vertical pole.

During a side impact, the cross-members 50, 52 transmit forces between the first rocker 16 and the second rocker 18. For example, in the event of an impact of the first rocker 16, the cross-member 50 transmits the force from the impact to the tunnel 44, which absorbs some of the force through deformation and transmits some of the force through the second cross-member 52 to the second rocker 18, which also absorbs some of the force through deformation. Both the first rocker 16 and the second rocker 18 distribute the force as a result of the sealed pressurized inserts, 28, 30, respectively. This distribution of the impact forces may reduce the likelihood and/or magnitude of intrusion at the first rocker 16. By reducing intrusion, the vehicle frame assembly 12 may reduce likelihood and/or magnitude of intrusion into the passenger compartment and/or may reduce the likelihood and/or magnitude of intrusion into the battery compartment 54 to limit and/or prevent the likelihood of damage to the battery 32 during the impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle frame assembly comprising:
    a rocker elongated along an axis and defining a tubular cavity elongated along the axis;
    a sealed pressurized insert disposed in the cavity and elongated along the axis, the sealed pressurized insert designed to contain and maintain pressurization of nontransitory inflation medium; and
    a reinforcing sleeve disposed in the tubular cavity and extending around the sealed pressurized insert.

2. A vehicle frame assembly according to claim 1, wherein the reinforcing sleeve is formed of metal.

3. A vehicle frame assembly according to claim 2, wherein the sealed pressurized insert is formed of rubber.

4. A vehicle frame assembly according to claim 1, wherein the rocker includes an inner panel and an outer panel joined together to define the tubular cavity therebetween.

5. A vehicle frame assembly according to claim 1, further comprising an undercarriage attached to the rocker and defining a battery compartment.

6. A vehicle frame assembly according to claim 5, wherein the undercarriage includes a tunnel, and further comprising a cross-member extending from the rocker to the tunnel.

7. A vehicle frame assembly according to claim 1, wherein the sealed pressurized insert is formed of rubber.

8. A vehicle frame assembly according to claim 1, further comprising a pressure sensor in the sealed pressurized insert.

9. A vehicle comprising:
an undercarriage;
a rocker attached to the undercarriage, the rocker elongated along an axis and defining a tubular cavity elongated along the axis;
a battery supported by the undercarriage;
a sealed pressurized insert disposed in the cavity and elongated along the axis, the sealed pressurized insert designed to contain and maintain pressurization of nontransitory inflation medium; and
a reinforcing sleeve disposed in the tubular cavity and extending around the sealed pressurized insert.

10. A vehicle according to claim 9, wherein the reinforcing sleeve is formed of metal.

11. A vehicle according to claim 10, wherein the sealed pressurized insert is formed of rubber.

12. A vehicle according to claim 9, wherein the rocker includes an inner panel and an outer panel joined together to define the tubular cavity therebetween.

13. A vehicle according to claim 9, wherein the undercarriage includes a tunnel, and further comprising a cross-member extending from the rocker to the tunnel.

14. A vehicle according to claim 9, wherein the sealed pressurized insert is formed of rubber.

15. A vehicle according to claim 9, further comprising a processing device and a pressure sensor in communication with the sealed pressurized insert and with the processing device.

16. A vehicle according to claim 9, wherein the rocker is a first rocker, further comprising:
a second rocker elongated along a second axis parallel to the axis and defining a second tubular cavity elongated along the second axis; and
a second sealed pressurized insert disposed in the second cavity and elongated along the second axis.

17. A vehicle according to claim 16, further comprising a reinforcing sleeve disposed in the tubular cavity and extending around the sealed pressurized insert, and a second reinforcing sleeve disposed in the second tubular cavity and extending around the second sealed pressurized insert.

18. A vehicle according to claim 17, wherein the undercarriage includes a tunnel, and further comprising a first cross-member extending from the first rocker to the tunnel and a second cross-member extending from the second rocker to the tunnel.

\* \* \* \* \*